US008265021B2

(12) United States Patent
Nam et al.

(10) Patent No.: US 8,265,021 B2
(45) Date of Patent: Sep. 11, 2012

(54) DOWNLINK PHICH MAPPING AND CHANNELIZATION

(75) Inventors: Young-Han Nam, Plano, TX (US); Jianzhong Zhang, Irving, TX (US); Aris Papasakellariou, Houston, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 966 days.

(21) Appl. No.: 12/289,975

(22) Filed: Nov. 7, 2008

(65) Prior Publication Data

US 2009/0245187 A1    Oct. 1, 2009

Related U.S. Application Data

(60) Provisional application No. 61/064,763, filed on Mar. 25, 2008, provisional application No. 61/071,270, filed on Apr. 18, 2008, provisional application No. 61/136,387, filed on Sep. 2, 2008.

(51) Int. Cl.
    *H04W 4/00* (2009.01)
(52) U.S. Cl. .......................... 370/329; 455/434
(58) Field of Classification Search .................. 370/208, 370/280
    See application file for complete search history.

(56) References Cited

U.S. PATENT DOCUMENTS

| 7,894,330 B2 * | 2/2011 | Lee et al. | 370/208 |
| 2011/0007673 A1 * | 1/2011 | Ahn et al. | 370/280 |

OTHER PUBLICATIONS

3GPP TS 36.211 Standard, Version 8.2.0 (Mar. 2008), "*3rd Generation Partnership Project; Technical Specification Group Radio Access Network; Evolved Universal Terrestrial Radio Access (E-UTRA); Physical Channels and Modulation (Release 8)*".
3GPP TSG RAN WG1 Meeting #49bis, R1-073099, "*Downlink ACK/NACK Transmit Diversity*", Orlando, USA, Jun. 25-29, 2007.
3GPP TSG RAN WG1 Meeting #52, R1-081036, "*Investigation on Radio Resource Indication for PHICH in E-UTRA Downlink*", Sorrento, Italy, Feb. 11-15, 2008.
3GPP RAN WG1 #52, R1-081132, "*Orthogonal Sequence Definition for PHICH*", Sorrento, Italy, Feb. 11-15, 2008.
3GPP RAN WG1 #52, R1-081071, "*Way Forward on PHICH Allocation*", Sorrento, Italy, Feb. 11-15, 2008.
3GPP TS 36.213 Standard, Version 8.2.0 (Mar. 2008), "*3rd Generation Partnership Project; Technical Specification Group Radio Access Network; Evolved Universal Terrestrial Radio Access (E-UTRA); Physical layer procedures (Release 8)*".
3GPP TSG RAN WG1 #52, R1-081063, "*Text Proposal for PHICH to RE Mapping with Cell ID*", Sorrento, Italy, Feb. 11-15, 2008.

* cited by examiner

*Primary Examiner* — Yemane Mesfin
*Assistant Examiner* — Henry Baron

(57) ABSTRACT

Methods and apparatus for downlink Physical Hybrid Automatic Repeat-reQuest (HARQ) Indicator Channel (PHICH) mapping and channelization in a communication system. First, a base station assigns uplink (UL) physical resource block (PRB) indices to a set of units of user equipment in a cell. Then, for each user equipment, the base station calculates an index triple ($K_{PHICH,0}, K_{PHICH,1}, K_{PHICH,2}$) for three repetitions of a PHICH signal to be transmitted to the user equipment, with $K_{PHICH,i}$ being a PHICH index indicating a PHICH resource for transmitting the i-th repetition of the PHICH signal to the user equipment, and i=1, 2, 3. When a data packet is received from a unit of user equipment transmitted via at least one physical resource block (PRB) indicated by the at least one PRB index that is assigned to the user equipment, the base station transmits PHICH signals to the user equipment by using the PHICH resources indicated by the PHICH indices assigned to the user equipment.

32 Claims, 10 Drawing Sheets

DOWNLINK PHICH MAPPING AND CHANNELIZATION

CLAIM OF PRIORITY

This application makes reference to, incorporates the same herein, and claims all benefits accruing under 35 U.S.C. §119 from provisional applications earlier filed in the U.S. Patent & Trademark Office on 25 Mar. 2008 and there duly assigned Ser. No. 61/064,763, on 18 Apr. 2008 and there duly assigned Ser. No. 61/071,270, and on 2 Sep. 2008 and there duly assigned Ser. No. 61/136,387.

BACKGROUND OF THE INVENTION

1. Field of the Invention

The present invention relates to methods and apparatus for downlink Physical Hybrid Automatic Repeat-reQuest (HARQ) Indicator Channel (PHICH) mapping and channelization in a communication system.

2. Description of the Related Art

This application, pursuant to 37 C.F.R. §1.57, incorporates by reference the following publications:

[1] 3GPP LTE 36.211, version 8.2.0;
[2] R1-073099, "Downlink ACK/NACK Transmit Diversity", Samsung;
[3] R1-081036, "Investigation on Radio Resource Indication for PHICH in E-UTRA Downlink", NTT DoCoMo, Fujitsu, Mitsubishi Electric, Sharp, Toshiba Corporation;
[4] R1-081132, "Orthogonal Sequence Definition for PHICH", Qualcomm;
[5] R1-081071, "Way Forward on PHICH Allocation", Nokia, NSN, Samsung, LGE, NTT DoCoMo, Nortel, NEC, Motorola, Panasonic, Ericsson, Qualcomm;
[6] 3GPP LTE 36.213, version 8.1.0; and
[7] R1-081063, "Text Proposal for PHICH to RE mapping with cell ID", LGE, Samsung, Nortel, Panasonic, Motorola, Ericsson, Nokia, NSN, Qualcomm.

Telecommunication enables transmission of data over a distance for the purpose of communication between a transmitter and a receiver. The data is usually carried by radio waves and is transmitted using a limited transmission resource. That is, radio waves are transmitted over a period of time using a limited frequency range.

In Third ($3^{rd}$) Generation Partnership Project Long Term Evolution (3GPP LTE) systems, certain resource elements are allocated for control signal transmission. Therefore, the data symbols may be mapped into the resource elements that are not allocated for control signal transmission. Each data transmission carries information bits of one or multiple transport blocks. When a transport block is larger than the largest code block size, the information bits in a transport block may be segmented into multiple code blocks. The process of dividing the information bits in a transport block into multiple code blocks is called code block segmentation. Due to the limited selection of code block sizes and the attempt to maximize packing efficiency during the code block segmentation, the multiple code blocks of a transport block may have different sizes. Each code block will be encoded, interleaved, rate matched, and modulated. Therefore, the data symbols for a transmission may consist of modulation symbols of multiple code blocks.

A downlink physical channel corresponds to a set of resource elements carrying information originating from higher layers. Physical Hybrid Automatic Repeat-reQuest (HARQ) Indicator Channel (PHICH) is a downlink acknowledgement channel that are used by a base station (enhanced Node B, i.e., eNB) to acknowledge (ACK) or negatively acknowledge (NAK) uplink transmissions by a plurality of units user equipment (UE). In the downlink transmission, Physical Hybrid Automatic Repeat ReQuest (HARQ) Indicator Channel (PHICH) is defined for carrying the HARQ acknowledgement or negative acknowledgement signals. According to the third Generation Partnership Project 3GPP LTE standard [1], multiple PHICH resources mapped to the same set of resource elements constitute a PHICH group, where the PHICH resources within the same PHICH group are separated through different orthogonal sequences. A PHICH resource is identified by an index pair $$(n_{PHICH}^{group}, n_{PHICH}^{seq}),$$

where $$n_{PHICH}^{group}$$

is the PHICH group index, and $$n_{PHICH}^{seq}$$

is the orthogonal sequence index used for the PHICH resource within the PHICH group. The number of symbols within a PHICH group is the same as the one in a PHICH sequence, and a PHICH group is a sequence of twelve (12) symbols. Each quadruple (four (4) symbols) in a PHICH group is mapped to a resource-element group. Thus the twelve (12) symbols in a PHICH group are mapped to three resource-element groups.

Currently, a few methods were proposed to allocate the PHICH. In 3GPP contribution R1-073099 [2], I/Q domain multiplexing is proposed for DL PHICHs in order to increase the ACK/NACK multiplexing capacity. As pointed out in the same contribution [2], the I/Q multiplexing results in an I/Q leakage problem in the case of severe channel estimation error at the UE.

In contribution R1-081132 [4], it was stated that alternative spreading sequences for PHICH can alleviate the I/Q leakage problem. In fact, the new approach in contribution R1-081132 [4], however, does not alleviate the I/Q leakage problem but only gives the same performance as the original approach.

In a way forward on PHICH allocation [3], it is agreed to link PHICH groups to PRB indices. This implies that a UE will have only a single PHICH resource index pair $$(n_{PHICH}^{group}, n_{PHICH}^{seq})$$

for the three repetitions. Suppose that two UEs are assigned to index pairs $$(n_{PHICH}^{group}, n_{PHICH}^{seq,1}) \text{ and } (n_{PHICH}^{group}, n_{PHICH}^{seq,2})$$

respectively. We further suppose that $$n_{PHICH}^{seq,1} \text{ and } n_{PHICH}^{seq,2}$$

corresponds to Walsh codes W and jW, respectively. Then, a UE located closer to eNodeB may experience I/Q leakage problem during all the three PHICH repetitions.

SUMMARY OF THE INVENTION

It is therefore an object of the present invention to provide an improved method and apparatus for downlink PHICH mapping and channelization.

It is another object of the present invention to provide an improved method and apparatus to avoiding the experience I/Q leakage problem.

According to one aspect of the present invention, a base station assigns uplink (UL) physical resource block (PRB) indices to each one of a plurality of units of user equipment in a cell. For each user equipment, an index triple ($K_{PHICH,0}$, $K_{PHICH,1}$, $K_{PHICH,2}$) is assigned to three repetitions of a Physical Hybrid Automatic Repeat-reQuest (HARQ) Indicator Channel (PHICH) signal to be transmitted to the user equipment, with $K_{PHICH,i}$ being a PHICH index indicating a PHICH resource for transmitting the i-th repetition of the PHICH signal to the user equipment, and i=1, 2, 3. After data packets are transmitted from a user equipment (UE) over the physical resource blocks (PRBs) to enhanced NodeB (eNB), where eNB has informed the UE regarding the PRB indices that are assigned to the UE, PHICH signals are transmitted from eNB to the UE by using the PHICH resources indicated by the PHICH indices assigned to the UE.

The PHICH indices $K_{PHICH,0}$, $K_{PHICH,1}$, $K_{PHICH,2}$ may be the same with each other.

Alternatively, the PHICH indices $K_{PHICH,0}$, $K_{PHICH,1}$, $K_{PHICH,2}$ may be different from each other.

The index triple ($K_{PHICH,0}$, $K_{PHICH,1}$, $K_{PHICH,2}$) may be assigned in accordance with a certain scheme based upon the at least one PRB index that is assigned to the user equipment.

Each unit of user equipment may operate in a virtual-multiple-input multiple-output (MIMO) mode or in a normal mode. The index triples may be assigned to the units of UEs in the virtual MIMO mode and the units of UEs in the normal mode by using the same scheme. Alternatively, the index triples may be assigned to the units of UEs in the virtual-MIMO mode and the units of UEs in the normal mode by using different schemes.

A message may be transmitted to a unit of user equipment indicating whether the unit of UE is operating in a virtual MIMO mode or in a normal mode.

The physical resource index pair $$(n_{PHICH}^{group}, n_{PHICH}^{seq})$$

for transmitting the i-th repetition of the PHICH signal to the user equipment may be determined in dependence upon the PHICH index $K_{PHICH,i}$.

The PHICH group index for the i-th repetition of the PHICH signal, $$n_{PHICH}^{group}(K_{PHICH,i}),$$

may be mapped to the i-th resource element group of the PHICH group indexed by $$n_{PHICH}^{group}(K_{PHICH,i}),$$

According to another aspect of the present invention, a wireless terminal (eNB) in a communication system may be provided with a physical resource block (PRB) assigning unit, a PHICH assigning unit, a receiving unit and a transmitting unit. The physical resource block (PRB) assigning unit assigns at least one uplink (UL) PRB index to each one of a plurality of units of user equipment in a cell served by the wireless terminal. The PHICH assigning unit assigns, for each user equipment, an index triple ($K_{PHICH,0}$, $K_{PHICH,1}$, $K_{PHICH,2}$) to three repetitions of a PHICH signal to be transmitted to the user equipment. $K_{PHICH,i}$ is a PHICH index indicating a PHICH resource for transmitting the i-th repetition of the PHICH signal to the user equipment, and i=1, 2, 3. The receiving unit receives data packets from a unit of user equipment transmitted via at least one PRB indicated by the at least one PRB index that is assigned to the user equipment. The transmitting unit transmits PHICH signals to the user equipment by using the PHICH resources indicated by the PHICH indices assigned to the user equipment.

BRIEF DESCRIPTION OF THE DRAWINGS

A more complete appreciation of the invention and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE EMBODIMENTS

Aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive. The invention is illustrated by way of example, and not by way of limitation, in the figures of the accompanying drawings.

Figure 1:
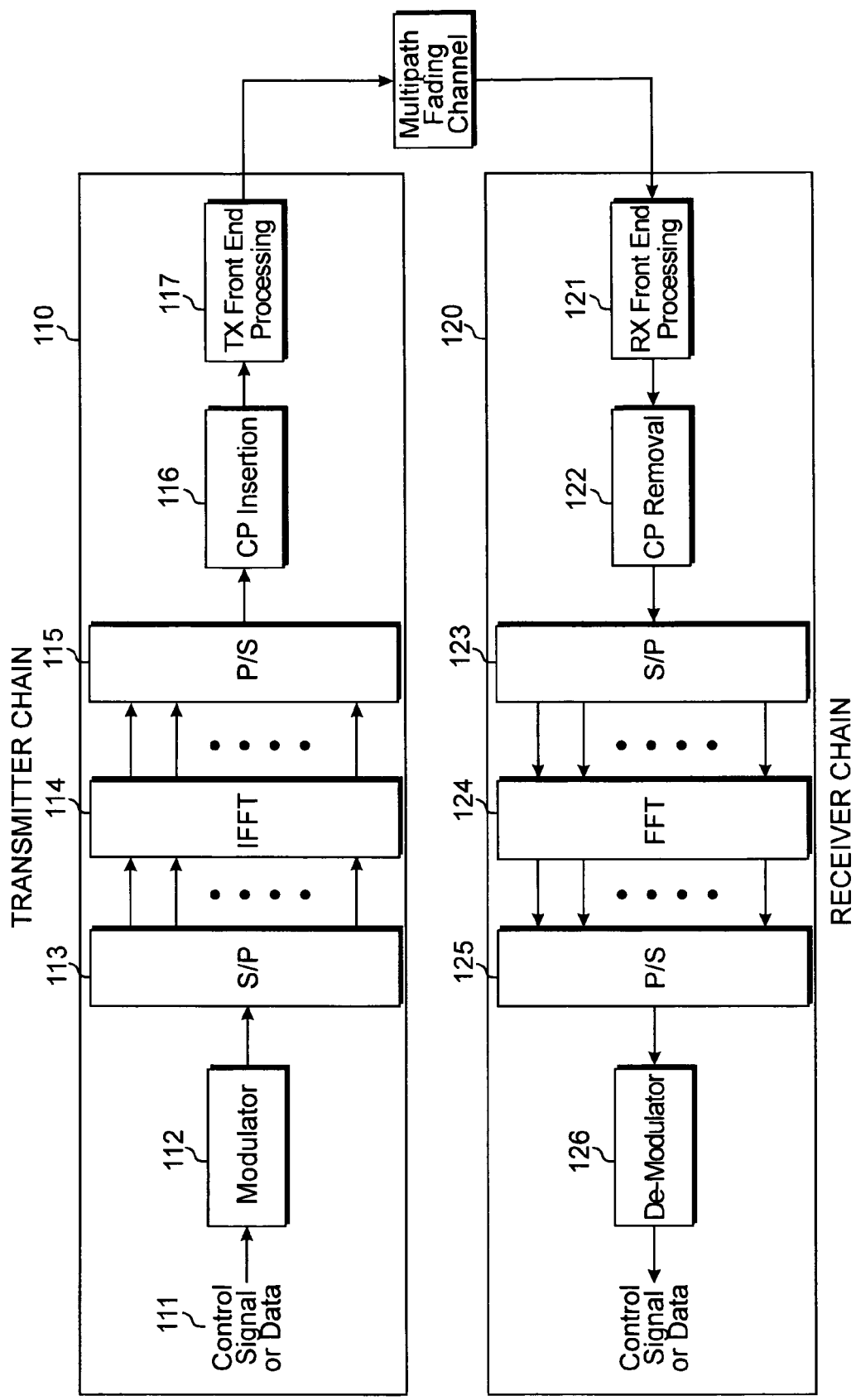
FIG. 1 schematically illustrates an Orthogonal Frequency Division Multiplexing (OFDM) transceiver chain.

FIG. 1 illustrates an Orthogonal Frequency Division Multiplexing (OFDM) transceiver chain. In a communication system using OFDM technology, at transmitter chain 110, control signals or data 111 is modulated by modulator 112 and is serial-to-parallel converted by Serial/Parallel (S/P) converter 113. Inverse Fast Fourier Transform (IFFT) unit 114 is used to transfer the signal from frequency domain to time domain. Cyclic prefix (CP) or zero prefix (ZP) is added to each OFDM symbol by CP insertion unit 116 to avoid or mitigate the impact due to multipath fading. Consequently, the signal is transmitted by transmitter (Tx) front end processing unit 117 and at least one antenna (not shown), or fixed wire or cable. The signal is transmitted from one or more antennas driven by unit 117 via the atmosphere and is subjected to multipath fading to arrive at a receiver. Note that the multipath fading channel illustrated in FIG. 1 refers to a transmission media (for example, atmosphere), and the multipath fading channel is not a component connected to the receiver, nor to the transmitter. At receiver chain 120, assuming perfect time and frequency synchronization are achieved, the signal received by receiver (Rx) front end processing unit 121 is processed by CP removal unit 122. Fast Fourier Transform (FFT) unit 124 transfers the received signal from time domain to frequency domain for further processing.

The total bandwidth in an OFDM system is divided into narrowband frequency units called subcarriers. The number of subcarriers is equal to the FFT/IFFT size N used in the system. In general, the number of subcarriers used for data is less than N because some subcarriers at the edge of the frequency spectrum are reserved as guard subcarriers. In general, no information is transmitted on guard subcarriers.

Figure 2:
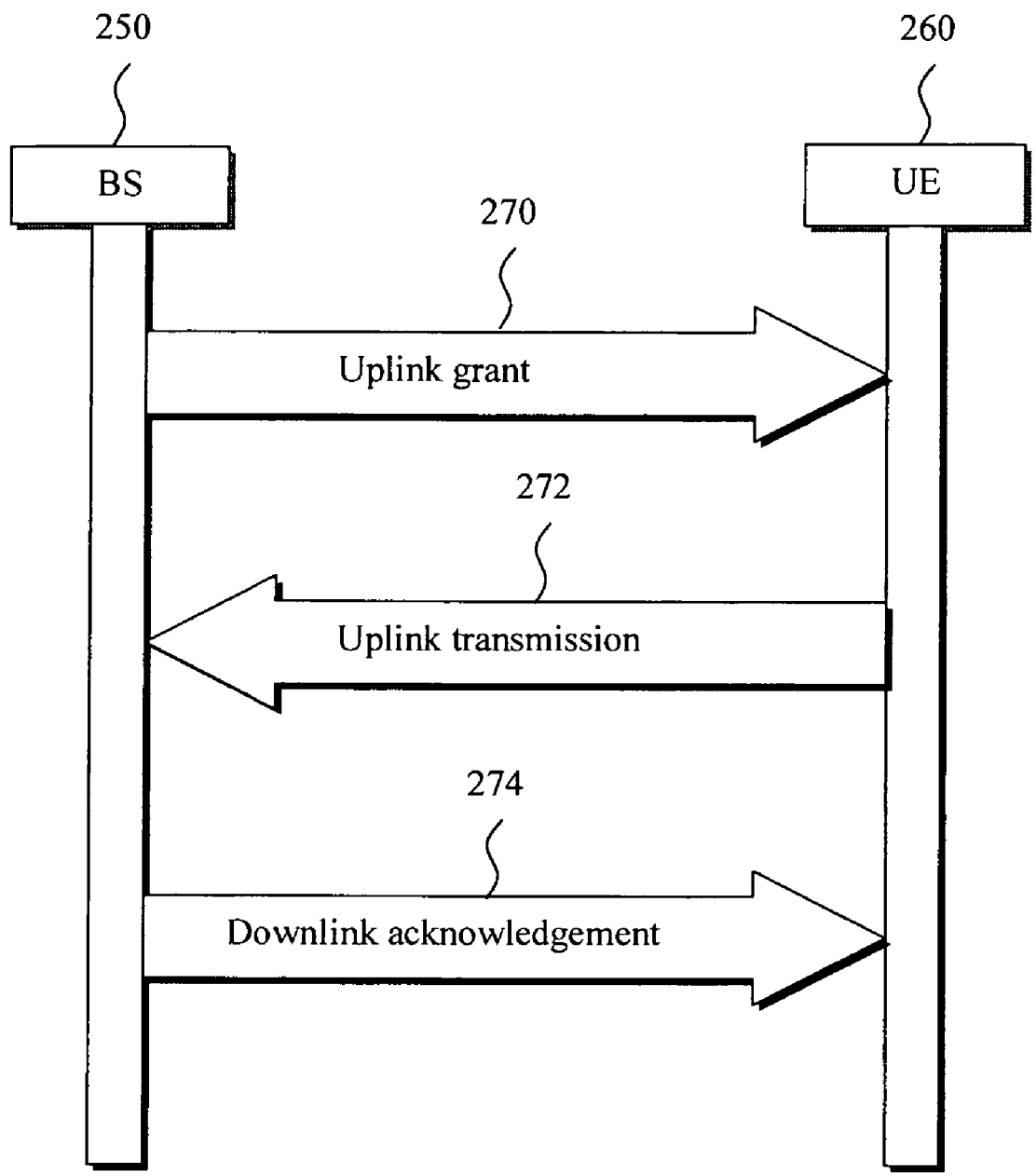
FIG. 2 illustrates a communication scheme between a base station (BS) and a unit of user equipment (UE) in packet-based wireless data communication systems.

FIG. 2 illustrates a communication scheme between a base station (BS) and a unit of user equipment (UE) in packet-based wireless data communication systems. First, BS 250 transmits an uplink grant to UE 260 to schedule an uplink transmission, via step 270. In response to the uplink grant, UE 260 transmits data and demodulation reference signal (DMRS) to BS 250. After receiving the data transmitted from UE 260, BS 250 may transmit an acknowledgement message or a negative acknowledgement message by using downlink acknowledgement channels.

Figure 3:
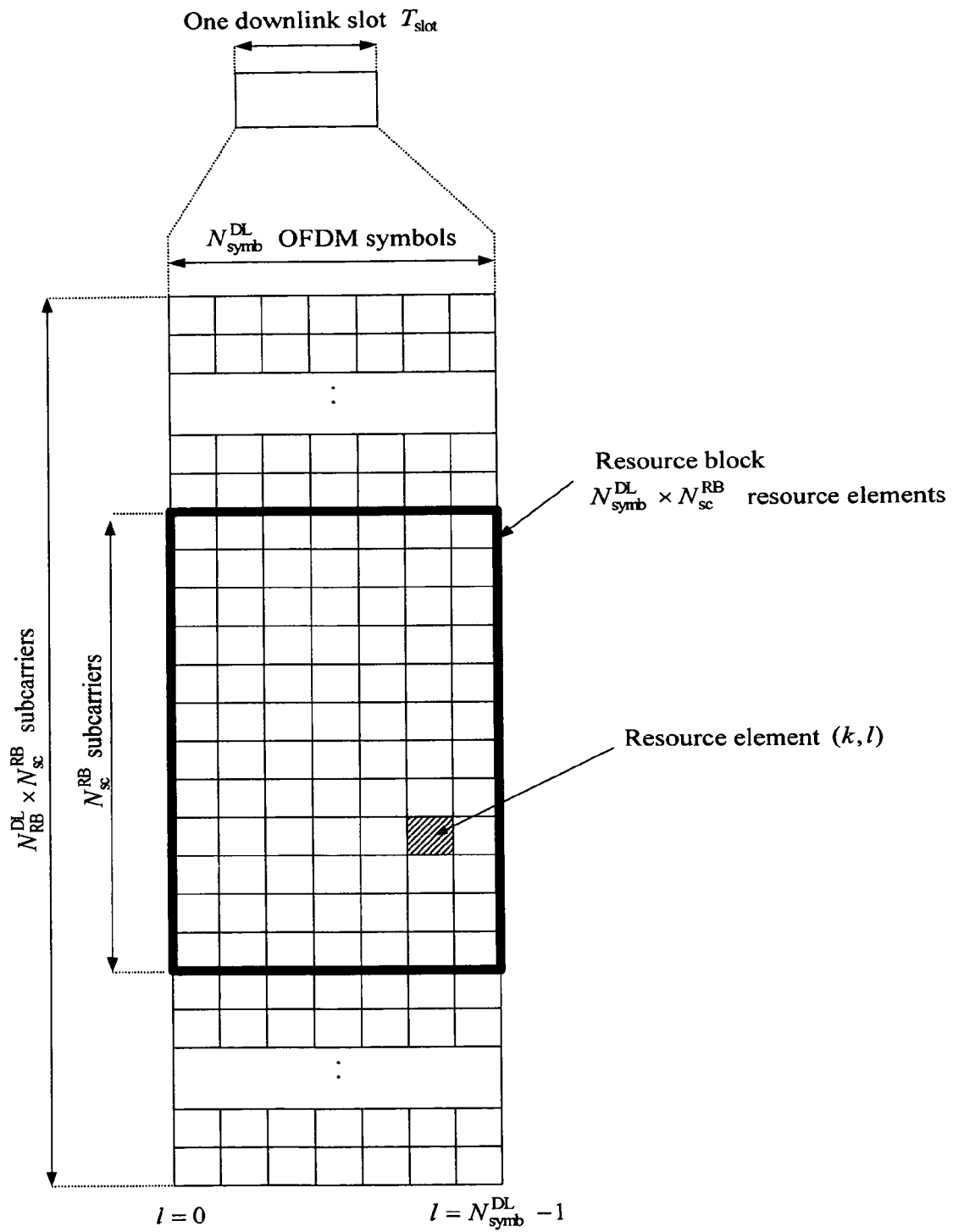
FIG. 3 schematically illustrates an example of a resource grid structure of a downlink slot.

FIG. 3 schematically illustrates a resource grid structure of a downlink slot according to the 3GPP LTE standard [1]. As shown in FIG. 3, the transmitted signal in each slot is described by a resource grid of $$N_{RB}^{DL} N_{sc}^{RB}$$

subcarriers in the frequency domain and $$N_{symb}^{DL}$$

OFDM symbols in the time domain.

$$N_{RB}^{DL}$$

denotes the downlink bandwidth in the frequency domain, and $$N_{sc}^{RB}$$

denotes the number of subcarriers in a resource block. Here, a physical resource block is defined as $$N_{symb}^{DL}$$

consecutive OFDM symbols in the time domain and $$N_{sc}^{RB}$$

consecutive subcarriers in the frequency domain.

Each element in the resource grid for an antenna port p is called a resource element, and is uniquely identified by the index pair (k,l) in a slot, where $$k = 0, \ldots, N_{RB}^{DL} N_{sc}^{RB} - 1 \text{ and } l = 0, \ldots, N_{symb}^{DL} - 1$$

are the indices in the frequency and time domains, respectively.

In the downlink transmission, Physical Hybrid Automatic Repeat ReQuest (HARQ) Indicator Channel (PHICH) is defined for carrying the HARQ acknowledgement or negative acknowledgement signals. According to the third Generation Partnership Project 3GPP LTE standard [1], multiple PHICH resources mapped to the same set of resource elements constitute a PHICH group, where the PHICH resources within the same PHICH group are separated through different orthogonal sequences. A PHICH resource is identified by an index pair $$(n_{PHICH}^{group}, n_{PHICH}^{seq}),$$

where $$n_{PHICH}^{group}$$

is the PHICH group index, and $$n_{PHICH}^{seq}$$

is the orthogonal sequence index used for the PHICH resource within the PHICH group. First, a block of bits b(0), . . . ,b($M_{bit}$−1) transmitted on one PHICH in one subframe shall be modulated using Binary Phase Shift Keying (BPSK), resulting in a block of complex-valued modulation symbols z(0), . . . ,z($M_s$−1), where $M_s$=$M_{bit}$. Then, the block of modulation symbols z(0), . . . ,z($M_s$−1) is bit-wise multiplied with an orthogonal sequence, resulting in a sequence of modulation symbols d(0), . . . ,d($M_{symb}$−1)_established by:

$$d(i) = w(i \bmod N_{SF}^{PHICH}) \cdot (1 - 2c(i)) \cdot z(\lfloor i / N_{SF}^{PHICH} \rfloor) \quad (1)$$

where $$i = 0, \ldots, M_{symb} - 1, \; M_{symb} = N_{SF}^{PHICH} \cdot M_s, \; N_{SF}^{PHICH}$$

denotes a spreading factor size used for PHICH modulation, $$N_{SF}^{PHICH} = 4$$

for normal cyclic prefix, $$N_{SF}^{PHICH} = 2$$

for extended cyclic prefix, and c(i) is a cell-specific scrambling sequence. The scrambling sequence generator shall be initialized with $$c_{init} = \lfloor n_s/2 \rfloor \cdot 2^9 + N_{ID}^{cell}$$

at the start of each subframe. The orthogonal sequence index $$n_{PHICH}^{seq}$$

is defined in Table 1.

TABLE 1

Orthogonal sequences for PHICH [1].

| Sequence index $n_{PHICH}^{seq}$ | Orthogonal sequence | |
|---|---|---|
| | Normal cyclic prefix $N_{SF}^{PHICH} = 4$ | Extended cyclic prefix $N_{SF}^{PHICH} = 2$ |
| 0 | [+1 +1 +1 +1] | [+1 +1] |
| 1 | [+1 −1 +1 −1] | [+1 −1] |
| 2 | [+1 +1 −1 −1] | [+j +j] |
| 3 | [+1 −1 −1 +1] | [+j −j] |
| 4 | [+j +j +j +j] | — |
| 5 | [+j −j +j −j] | — |
| 6 | [+j +j −j −j] | — |
| 7 | [+j −j −j +j] | — |

Figure 4:
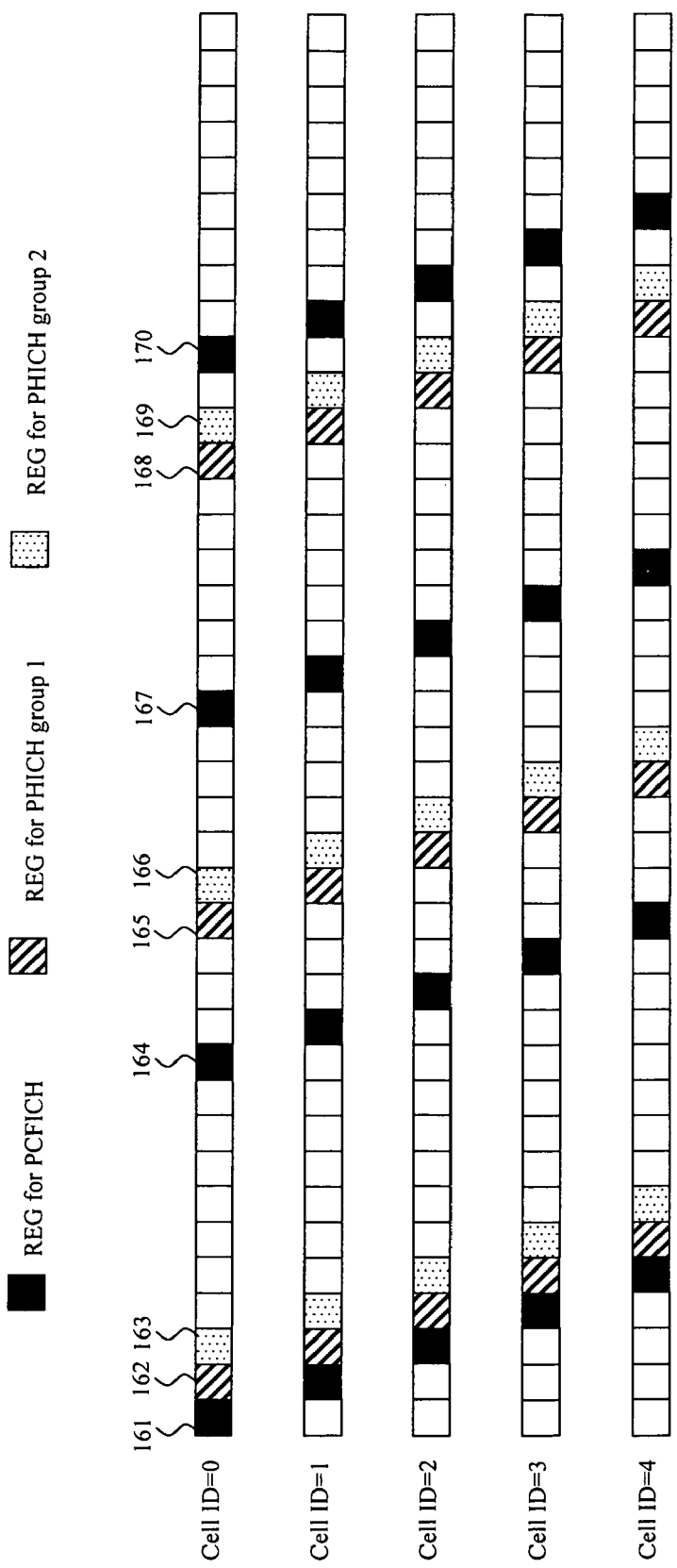
FIG. 4 schematically illustrates an example of a mapping scheme between PHICH resources and resource element groups (REGs)

FIG. 4 schematically illustrates an example of a mapping scheme between PHICH resources and resource elements (REs) according to 3GPP contribution R1-081063 [7]. In FIG. 4, two PHICH groups, PHICH group 1 and PHICH group 2, are available in the system (i.e., $$n_{PHICH}^{group}$$

is either 1 or 2), and three resource element groups (REGs) are assigned for each PHICH group index. Take cell 0 for example, REGs 161, 164, 167 and 170 are assigned to Physical control format indicator channel (PCFICH); REGs 162, 165 and 168 are assigned to PHICH group 1; and REGs 163, 166 and 169 are assigned to PHICH group 2.

In 3GPP contribution R1-073099 [2], I/Q domain multiplexing is proposed for DL PHICHs in order to increase the ACK/NACK multiplexing capacity. As pointed out in the same contribution [2], the I/Q multiplexing results in I/Q leakage problem in the case of severe channel estimation error at the UE.

To illustrate the I/Q leakage problem, an analytical model is constructed as in the following. For simplicity, we assume that the base station (eNodeB) has one transmission antenna (1 Tx antenna) and each of the UEs has one receiving antenna (1 Rx antenna). Note that the derivation here can be easily extended to MIMO cases as well. We consider two UEs: one (UE 1) is located close to eNodeB and the other (UE 2) is located far away from eNodeB. For UE 1, eNodeB uses a spreading sequence W=[$w_1,w_2,w_3,w_4$]$^t$, which is a Walsh code, and power $P_1$ for a PHICH bit $x_1$, whereas for UE 2, eNodeB uses a spreading sequence jW and power $P_2$ for a PHICH bit $x_2$. Here, $w_1,w_2,w_3,w_4 \in \{\pm1,\pm j\}$ and $$x_1, x_2 \in \{e^{j\frac{\pi}{4}}, e^{j\frac{5\pi}{4}}\},$$

which is the Binary Phase Shift Keying (BPSK) modulation as defined in the LTE standards (Reference [1]). Under given topology of the nodes, the powers assigned by eNodeB have a relation $P_1 \ll P_2$. Now, we focus on UE 1. Let the channel coefficients between eNodeB and UE 1 be H=diag($h_1,h_2,h_3,h_4$) for the PHICH resource elements (REs). Then, UE 1 receives a signal:

$$y_1 = H(\sqrt{P_1} W x_1 + j\sqrt{P_2} W x_2) + z, \quad (2)$$

where z is the additive Gaussian noise. If UE 1 perfectly estimates H, UE 1 does not see any interference caused by the presence of UE 2's PHICH when a standard Maximum Ratio Combining (MRC) and de-spreading is utilized:

$$Re(W^* H^* y_1 e^{-j\frac{\pi}{4}}) = \sum_{l=1}^{4} |h_l w_l|^2 \sqrt{P_1} \, x_1 + Re(\tilde{z}) \quad (3)$$

$$= \sum_{l=1}^{4} |h_l|^2 \sqrt{P_1} \, x_1 + Re(\tilde{z}),$$

where $\tilde{z}$ is the appropriately scaled noise. When UE 1 erroneously estimates H as Ĥ=diag($\hat{h}_1,\hat{h}_2,\hat{h}_3,\hat{h}_4$), however, the standard detection procedure yields decision statistics:

$$Re(W^* \hat{H}^* y_1 e^{-j\frac{\pi}{4}}) = Re\left(\sum_{l=1}^{4} \hat{h}_l^* h_l(\sqrt{P_1} x_1 + j\sqrt{P_2} x_2) + \tilde{z}\right), \quad (4)$$

where we used the fact that $|w_l|^2=1, \forall l$. Now, this detection statistics is contributed by $x_2$ as well. Since the power $P_2$ for UE 2's PHICH can be significantly higher than $P_1$, the bit error performance for UE 1's PHICH in the in-phase (I) domain can deteriorate a lot owing to the leakage of $x_2$'s signal in the quadrature (Q) domain. Simulation results on the I/Q leakage problem are available in 3GPP contribution R1-081036 [3]. As the power ratio $P_2/P_1$ increases, channel estimation error results in larger impact on the bit error performance at UE 1. When multiple antennas are employed at the receiver, one way to combine the received signals over multiple antennas for demodulation of the transmitted signal is MRC. For example, suppose that two receive antennas are at the receiver, the channel gains between receive antennas and a transmit antenna are denoted by $h_1$ and $h_2$, and the two received signals at the two antennas are denoted by $y_1$ and $y_2$. Then, we may coherently combine the two received signals $y_1$ and $y_2$ or we obtain $y=h^*_1 y_1 + h^*_2 y_2$, which will be used for demodulating the signal transmitted by the transmit antenna.

In contribution R1-081132 [4], it was stated that alternative spreading sequences for PHICH can alleviate the I/Q leakage problem. The new approach in contribution R1-081132 [4], however, does not alleviate the I/Q leakage problem but only gives the same performance as the original approach due to the following reasons. First, since the detection statistics at the UE 1 does not depend on the specific choice of W as shown in Equations (3) and (4), switching a spreading sequence to another spreading sequence does not make any difference on the detection performance of a UE that experiences I/Q leakage problem. Secondly, the LTE-BPSK modulation symbols, $$\pm\left(\frac{1}{\sqrt{2}} + j\frac{1}{\sqrt{2}}\right),$$

contains both I and Q components. This also serves as an argument that choosing Walsh code balanced in I and Q domains does not help to balance powers of modulation symbols in I and Q domains.

An HARQ acknowledgement indicator is encoded into three bits, where the HARQ indicator (HI) 0 is encoded into <0, 0, 0>, while HI 1 is encoded into <1, 1, 1>. In such a sense, an HI is repeated three times.

Each of these three bits are modulated and spread by $$N_{SF}^{PHICH},$$

forming a PHICH sequence of length $$M_{bit} N_{SF}^{PHICH}, \text{ where } M_{bit} = 3 \text{ and } N_{SF}^{PHICH} = 4$$

in the normal cyclic-prefix case. As described in Section 6.9.3 of the 3GPP LTE standard TS 36.211, a PHICH group is formed by summing up multiple PHICH sequences. The number of symbols within a PHICH group is the same as the one in a PHICH sequence, and a PHICH group is a sequence of twelve (12) symbols. Each quadruple (four symbols) in a PHICH group is mapped to a resource-element group. Thus the twelve (12) symbols in a PHICH group are mapped to three resource-element groups.

In a way forward on PHICH allocation [3], it is agreed to link PHICH groups to PRB indices. A PHICH resource $$(n_{PHICH}^{group}, n_{PHICH}^{seq})$$

is assigned based on the lowest physical resource group (PRB) index of a UE, $$I_{PRB\_RA}^{lowest\_index}.$$

According to 3GPP LTE standard 36.213 [6]:

$$n_{PHICH}^{group} = (I_{PRB\_RA}^{lowest\_index} + n_{DMRS}) \bmod N_{PHICH}^{group} \quad (5)$$
$$n_{PHICH}^{seq} = (\lfloor I_{PRB\_RA}^{lowest\_index} / N_{PHICH}^{group} \rfloor + n_{DMRS}) \bmod 2N_{SF}^{PHICH},$$

where $n_{DMRS}$ is the cyclic shift of the demodulation reference symbol (DMRS) used in the uplink (UL) transmission for which the PHICH is related, $$N_{SF}^{PHICH}$$

is the spreading factor size used for PHICH, $$I_{PRB\_RA}^{lowest\_index}$$

is the lowest index PRB of the uplink resource allocation, and $$N_{PHICH}^{group}$$

is the number of PHICH groups configured. This implies that a UE will have only a single PHICH resource index pair $$(n_{PHICH}^{group}, n_{PHICH}^{seq})$$

for the three repetitions of an HARQ acknowledgement indicator signal. Suppose that two UEs are assigned to a PHICH group $$n_{PHICH}^{group}$$

and they use Walsh codes W and jW, respectively. Then, a UE located closer to eNodeB may experience I/Q leakage problem during all the three PHICH repetitions.

In a first embodiment according to the principles of the present invention, we propose to improve the PHICH channelization as follows. For the three repetitions of each UE's PHICH signal, we assign an index triple, ($K_{PHICH,0}$, $K_{PHICH,1}, K_{PHICH,2}$), where $K_{PHICH,i}$ denotes a PHICH index for repetition i of the PHICH signal, for i=0, 1, 2. The values $K_{PHICH,0}$, $K_{PHICH,1}$, $K_{PHICH,2}$ may or may not be the same in our proposal.

We further propose to assign different index triples, ($K_{PHICH,0}, K_{PHICH,1}, K_{PHICH,2}$), according to the uplink (UL) Physical resource block (PRB) indices that a UE is assigned.

A first example of such assignment (denoted as method A) is,

1. If the number of UL PRBs is $$N_{PHICH}^{PRB} = 1,$$

and the PRB index is $$I_{PRB\_RA}^{lowest\_index},$$

then we have:

$$(K_{PHICH,0}, K_{PHICH,1}, K_{PHICH,2}) = (I_{PRB\_RA}^{lowest\_index}, I_{PRB\_RA}^{lowest\_index}, I_{PRB\_RA}^{lowest\_index}). \quad (6)$$

2. If the number of UL PRBs is $$N_{PHICH}^{PRB} = 2,$$

and the lower PRB index is $$I_{PRB\_RA}^{lowest\_index},$$

then we have:

$$(K_{PHICH,0}, K_{PHICH,1}, K_{PHICH,2}) = \quad (7)$$
$$(I_{PRB\_RA}^{lowest\_index}, I_{PRB\_RA}^{lowest\_index}, I_{PRB\_RA}^{lowest\_index} + 1).$$
or,
$$(K_{PHICH,0}, K_{PHICH,1}, K_{PHICH,2}) = \quad (8)$$
$$(I_{PRB\_RA}^{lowest\_index}, I_{PRB\_RA}^{lowest\_index} + 1, I_{PRB\_RA}^{lowest\_index} + 1).$$

3. If the number of UL PRBs is $$N_{PHICH}^{PRB} \geq 3,$$

and the lowest PRB index is $$I_{PRB\_RA}^{lowest\_index},$$

then we have:

$$(K_{PHICH,0}, K_{PHICH,1}, K_{PHICH,2}) = \quad (9)$$
$$(I_{PRB\_RA}^{lowest\_index}, I_{PRB\_RA}^{lowest\_index} + 2, I_{PRB\_RA}^{lowest\_index} + 1).$$
or
$$(K_{PHICH,0}, K_{PHICH,1}, K_{PHICH,2}) = \quad (10)$$
$$(I_{PRB\_RA}^{lowest\_index} + 1, I_{PRB\_RA}^{lowest\_index}, I_{PRB\_RA}^{lowest\_index} + 2).$$

A second example of such assignment (denoted as method B) is,

1. If the number of UL PRBs is $$N_{PHICH}^{PRB} = 1,$$

and the PRB index is $$I_{PRB\_RA}^{highest\_index},$$

then we have:

$$(K_{PHICH,0}, K_{PHICH,1}, K_{PHICH,2}) = \quad (11)$$
$$(I_{PRB\_RA}^{highest\_index}, I_{PRB\_RA}^{highest\_index}, I_{PRB\_RA}^{highest\_index}).$$

2. If the number of UL PRBs is $$N_{PHICH}^{PRB} = 2,$$

and the highest PRB index is $$I_{PRB\_RA}^{highest\_index},$$

then we have:

$$(K_{PHICH,0}, K_{PHICH,1}, K_{PHICH,2}) = \quad (12)$$
$$(I_{PRB\_RA}^{highest\_index}, I_{PRB\_RA}^{highest\_index}, I_{PRB\_RA}^{highest\_index} - 1).$$

3. If the number of UL PRBs is $$N_{PHICH}^{PRB} \geq 3,$$

and the highest PRB index is $$I_{PRB\_RA}^{highest\_index},$$

then we have:

$$(K_{PHICH,0}, K_{PHICH,1}, K_{PHICH,2}) = \quad (13)$$
$$\left(I_{PRB\_RA}^{highest\_index}, I_{PRB\_RA}^{highest\_index} - 2, I_{PRB\_RA}^{highest\_index} - 1\right).$$

A third example of such assignment (denoted as method C) is,
1. If the number of UL PRBs is $$N_{PHICH}^{PRB} = 1$$

and the PRB index is $$I_{PRB\_RA}^{lowest\_index},$$

then we have:

$$(K_{PHICH,0}, K_{PHICH,1}, K_{PHICH,2}) = \quad (14)$$
$$\left(I_{PRB\_RA}^{lowest\_index}, I_{PRB\_RA}^{lowest\_index}, I_{PRB\_RA}^{lowest\_index}\right).$$

2. If the number of UL PRBs is $$N_{PHICH}^{PRB} = 2,$$

and the lowest PRB index is $$I_{PRB\_RA}^{lowest\_index},$$

then we have:

$$(K_{PHICH,0}, K_{PHICH,1}, K_{PHICH,2}) = \quad (15)$$
$$\left(I_{PRB\_RA}^{lowest\_index}, I_{PRB\_RA}^{lowest\_index}, I_{PRB\_RA}^{lowest\_index}\right).$$

3. If the number of UL PRBs is $$N_{PHICH}^{PRB} \geq 3,$$

and the lowest PRB index is $$I_{PRB\_RA}^{lowest\_index},$$

then we have:

$$(K_{PHICH,0}, K_{PHICH,1}, K_{PHICH,2}) = \quad (16)$$
$$\left(I_{PRB\_RA}^{lowest\_index}, I_{PRB\_RA}^{lowest\_index}, I_{PRB\_RA}^{lowest\_index}\right).$$

In a multi-user multiple-input multiple-output (MIMO) uplink channel, the presence of multiple receiving antennas enables a base station to serve a number of users simultaneously, thus increasing overall system throughput. In practice, users have to be scheduled instead of being served all at once. In the MIMO uplink channel, several transmitters (e.g. user terminals) may or may not send data to a single receiver (e.g. base station) simultaneously. Such a concurrent transmission is enabled by the presence of multiple antennas at the base station, which can apply spatial processing to separate data streams. Having multiple antennas, the base station is able to receive data streams from several users concurrently by exploiting the spatial properties of the transmission channel, resulting in a significantly enhanced system throughput. The concept of serving several users at the same resource is sometimes also referred to as "virtual-MIMO" or spatial division multiple access (SDMA).

In a second embodiment according to the principles of the present invention, when a cell has both virtual-MIMO UEs and normal UEs (to which a set of PRBs is exclusively assigned to each UE), we may assign index triples ($K_{PHICH,0}, K_{PHICH,1}, K_{PHICH,2}$) to UEs either utilizing the same method, or different methods for virtual-MIMO UEs and normal UEs. For example, we may utilize method C for assigning index triples to virtual MIMO UEs, and method A for assigning index triples to normal UEs. As a result, a UE needs to know whether it is a virtual MIMO UE or not. One example of obtaining this information at the UE is to add one more bit to Physical Downlink Control Channel (PDCCH) to inform every UE whether the UE is operating in a virtual MIMO mode or not. Another example of obtaining this information at the UE is to assign a first Radio Network Temporary Identifier (RNTI) ID to a UE if the UE is to operate in the virtual MIMO mode, and to assign another RNTI ID to the UE if the UE is to operate in the non-virtual MIMO mode. In other words, a UE may be assigned with two RNTI IDs. One is for the case when the UE is operating in the virtual MIMO mode; the other is for the case when the UE is operating in the non-virtual MIMO mode.

In a third embodiment according to the principles of the present invention, for each repetition #i, physical resource index pair $$(n_{PHICH}^{group}(K_{PHICH,i}), n_{PHICH}^{seq}(K_{PHICH,i})),$$

which indicates the PHICH group and PHICH sequence used for the repetition #i, is a function of the $K_{PHICH,i}$.

Figures 5A, 5B:
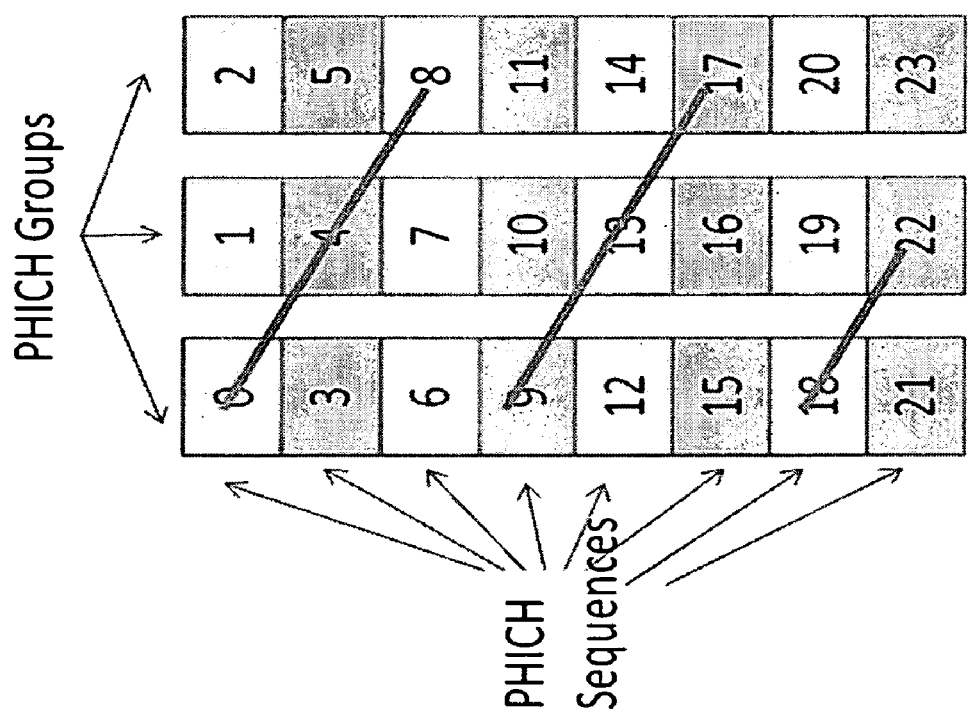
FIG. 5(a) schematically illustrates a linking scheme between a PHICH index and a PHICH resource index pair according to an embodiment of the principles of the present invention.
FIG. 5(b) schematically illustrates a linking scheme between a PHICH index and a PHICH resource index pair according to another embodiment of the principles of the present invention.

For example, one method of defining this function is, $$n_{PHICH}^{group}(K_{PHICH,i}) = (K_{PHICH,i} + n_{DMRS}) \bmod N_{PHICH}^{group} \quad (17)$$
$$n_{PHICH}^{seq}(K_{PHICH,i}) = (\lfloor K_{PHICH,i} / N_{PHICH}^{group} \rfloor + n_{DMRS}) \bmod 2N_{SF}^{PHICH},$$

where $n_{DMRS}$ is the cyclic shift of the DMRS used in the UL transmission for which the PHICH is related, and $n_{DMRS}$ is a parameter obtained by higher layer signaling. For example, $n_{DMRS}=0$ is a typical use case. For another example, $n_{DMRS}$ is chosen such that no two UEs have the same $K_{PHICH,i}$ in a cell in a time slot, for i=0, 1, 2. We illustrate the linking scheme between the PHICH index $K_{PHICH,i}$, and the PHICH resource index pair $$(n_{PHICH}^{group}(K_{PHICH,i}), n_{PHICH}^{seq}(K_{PHICH,i})),$$

according to this method in FIG. 5(a), where the solid lines show the location of $$n_{PHICH}^{group} \text{ and } n_{PHICH}^{seq}.$$

For example, when $n_{DMRS}=2$ and $K_{PHICH,0}=0$, we have $$n_{PHICH}^{group}(K_{PHICH,0}) = 2$$

and $n_{PHICH}^{seq}(K_{PHICH,0})=2$. Suppose that $K_{PHICH,0}=0$. Then, the virtual MIMO UEs sharing this $K_{PHICH,0}=0$ assigned to different PHICH resources due to different $n_{DMRS}$ assigned to different UEs. We further suppose that there are three virtual MIMO UEs, UE 0, UE 1 and UE 2, sharing $K_{PHICH,0}=0$, and their $n_{DMRS}$ values are 0, 1 and 2, respectively. Then, according to Equation (17), UE 0 will have $$(n_{PHICH}^{group}(K_{PHICH,0}), n_{PHICH}^{seq}(K_{PHICH,0})) = (0, 0);$$

UE 1 will have $$(n_{PHICH}^{group}(K_{PHICH,0}), n_{PHICH}^{seq}(K_{PHICH,0})) = (1, 1);$$

and UE 2 will have $$(n_{PHICH}^{group}(K_{PHICH,0}), n_{PHICH}^{seq}(K_{PHICH,0})) = (2, 2).$$

Another method of defining this function is, $$n_{PHICH}^{group}(K_{PHICH,i}) = (K_{PHICH,i} + n_{DMRS}) \bmod N_{PHICH}^{group} \quad (18)$$

$$n_{PHICH}^{seq}(K_{PHICH,i}) = \lfloor (K_{PHICH,i} + n_{DMRS})/N_{PHICH}^{group} \rfloor \bmod 2N_{SF}^{PHICH}.$$

We illustrate the linking scheme between the PHICH index $K_{PHICH,i}$, and the PHICH resource index pair $$(n_{PHICH}^{group}(K_{PHICH,i}), n_{PHICH}^{seq}(K_{PHICH,i}))$$

according to this method in FIG. 5(b). We again suppose that $K_{PHICH,0}=0$ and that there are three virtual MIMO UEs UE 0, UE 1 and UE 2 sharing $K_{PHICH,0}=1$, and their $n_{DMRS}$ values are 0, 1 and 2, respectively. Then, according to Equation (18), UE 0 will have $$(n_{PHICH}^{group}(K_{PHICH,0}), n_{PHICH}^{seq}(K_{PHICH,0})) = (0, 0);$$

UE 1 will have $$(n_{PHICH}^{group}(K_{PHICH,0}), n_{PHICH}^{seq}(K_{PHICH,0})) = (1, 0);$$

finally UE 2 will have $$(n_{PHICH}^{group}(K_{PHICH,0}), n_{PHICH}^{seq}(K_{PHICH,0})) = (2, 0).$$

Thus, as $n_{DMRS}$ increases, the orange line runs from the top left to bottom right, and the spot at which the orange line coincides represents the indices for the PHICH group and the PHICH sequence that a virtual MIMO UE will be allocated to. For example, spot 8 in the FIG. 5(b) is representing PHICH group 2 and PHICH sequence 2, which is for $K_{PHICH,0}=0$ and $n_{DMRS}=2$.

In a fourth embodiment according to the principles of the present invention, the PHICH group index for repetition #i, $$n_{PHICH}^{group}(K_{PHICH,i}),$$

will be mapped to i-th REG of the PHICH group indexed by $$n_{PHICH}^{group}(K_{PHICH,i}).$$

Figure 6:
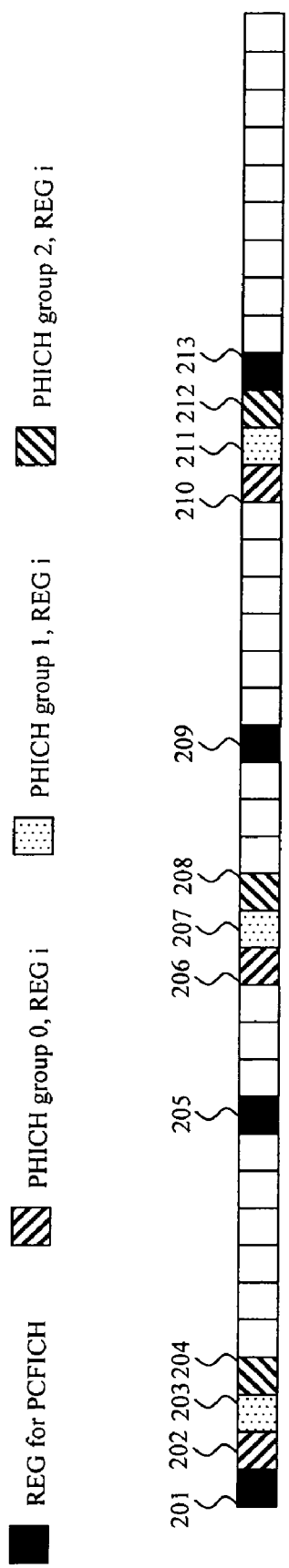
FIG. 6 schematically illustrates a mapping scheme between the PHICH group index and the resource element groups as an embodiment according to the principles of the present invention.

FIG. 6 schematically illustrates one example of a mapping scheme between the PHICH group index for repetition i, $$n_{PHICH}^{group}(K_{PHICH,i}),$$

and the REGs. As shown in FIG. 6, REGs 201, 205, 209 and 213 are assigned to Physical control format indicator channel (PCFICH); REGs 202, 206 and 210 are assigned to PHICH group 1; REGs 203, 207, and 211 are assigned to PHICH group 2; and REGs 204, 208 and 212 are assigned to PHICH group 3. Here, REG 202 is the first REG (i=0) for the first repetition for PHICH group 1; REG 206 is the second REG (i=1) for the second repetition for PHICH group 1; and REG 210 is the third REG (i=2) for the third repetition for PHICH group 1. Similarly, REG 203 is the first REG (i=0) for the first repetition for PHICH group 2; REG 207 is the second REG (i=1) for the second repetition for PHICH group 2; and REG 211 is the third REG (i=2) for the third repetition for PHICH group 2. Still similarly, REG 204 is the first REG (i=0) for the first repetition for PHICH group 3; REG 208 is the second REG (i=1) for the second repetition for PHICH group 3; and REG 212 is the third REG (i=2) for the third repetition for PHICH group 3. As explained before, a PHICH group is a sequence of twelve (12) symbols. Each quadruple consisting of four (4) symbols in a PHICH group is mapped to a resource-element group; thus the twelve (12) symbols in a PHICH group are mapped to three resource-element groups. More precisely, the first quadruple (or $$n_{PHICH}^{group}(K_{PHICH,0})$$

is mapped to REG 0; the second quadruple (or $$n_{PHICH}^{group}(K_{PHICH,1})$$

is mapped to REG 1; the last (or $$n_{PHICH}^{group}(K_{PHICH,2})$$

is mapped to REG 2. In such a sense, in Table 2, repetition 0 is mapped to REG 0, repetition 1 is mapped to REG 1, and finally repetition 2 is mapped to REG 2.

Under this approach, a UE that is close to eNodeB, potentially receives three repeated PHICH signals in different REGs where different UEs are mapped together. Even if the UE experiences the I/Q leakage problem in the first repetition because another UE is using the same Walsh code, the PHICH signals transmitted in the other two repetitions do not necessarily reach the UE with the same Walsh code. In the case of four transmitting (4 Tx) antenna diversity, we need to make sure that the three repetition PHICH signals are transmitted under two different transmit antenna configurations. For example, we can use any of methods A, B and C that are explained previously, to ensure this.

We now provide an illustrative example for method A. We assume that four UEs are assigned with UL PRB indices as listed in the two left-hand columns in Table 2. In addition, we assume that 3 PHICH groups are available in a normal PHICH duration. Then, PHICH signals are mapped to PHICH resources as in the two right-hand columns in the following table. Note that the first PRB index in the set of PRB indices assigned to each UE is used for determining index triple $(K_{PHICH,0}, K_{PHICH,1}, K_{PHICH,2})$ in method A.

TABLE 2

PRB and PHICH resource assignments

| UE index | PRB index | Original assignment for three repetitions (repetition i, $n_{PHICH}^{group}$, $n_{PHICH}^{seq}$) | Proposed assignment for three repetitions (repetition i, $n_{PHICH}^{group}$, $n_{PHICH}^{seq}$) |
|---|---|---|---|
| 0 | 0, 1, 2, 3 | (0, 0, 0), (1, 0, 0), (2, 0, 0) | (0, 0, 0), (1, 2, 0), (2, 1, 0) |
| 1 | 4, 5 | (0, 1, 1), (1, 1, 1), (2, 1, 1) | (0, 1, 1), (1, 1, 1), (2, 2, 1) |
| 2 | 6, 7 | (0, 0, 2), (1, 0, 2), (2, 0, 2) | (0, 0, 2), (1, 0, 2), (2, 1, 2) |
| 3 | 8, 9, 10, 11 | (0, 2, 2), (1, 2, 2), (2, 2, 2) | (0, 2, 2), (1, 1, 3), (2, 0, 3) |
| 4 | 12 | (0, 0, 4), (1, 0, 4), (2, 0, 4) | (0, 0, 4), (1, 0, 4), (2, 0, 4) |

According to Table 2, in the original assignment, all of the three repetition PHICH signals of a UE have the same PHICH group indices, whereas in the proposed assignment, they may have different indices. Specifically, take UE 0 for example. In the original assignment, UE 0 is assigned with PHICH group 0 in the first repetition, i.e., $$n_{PHICH}^{group} = 0;$$

Figure 7:
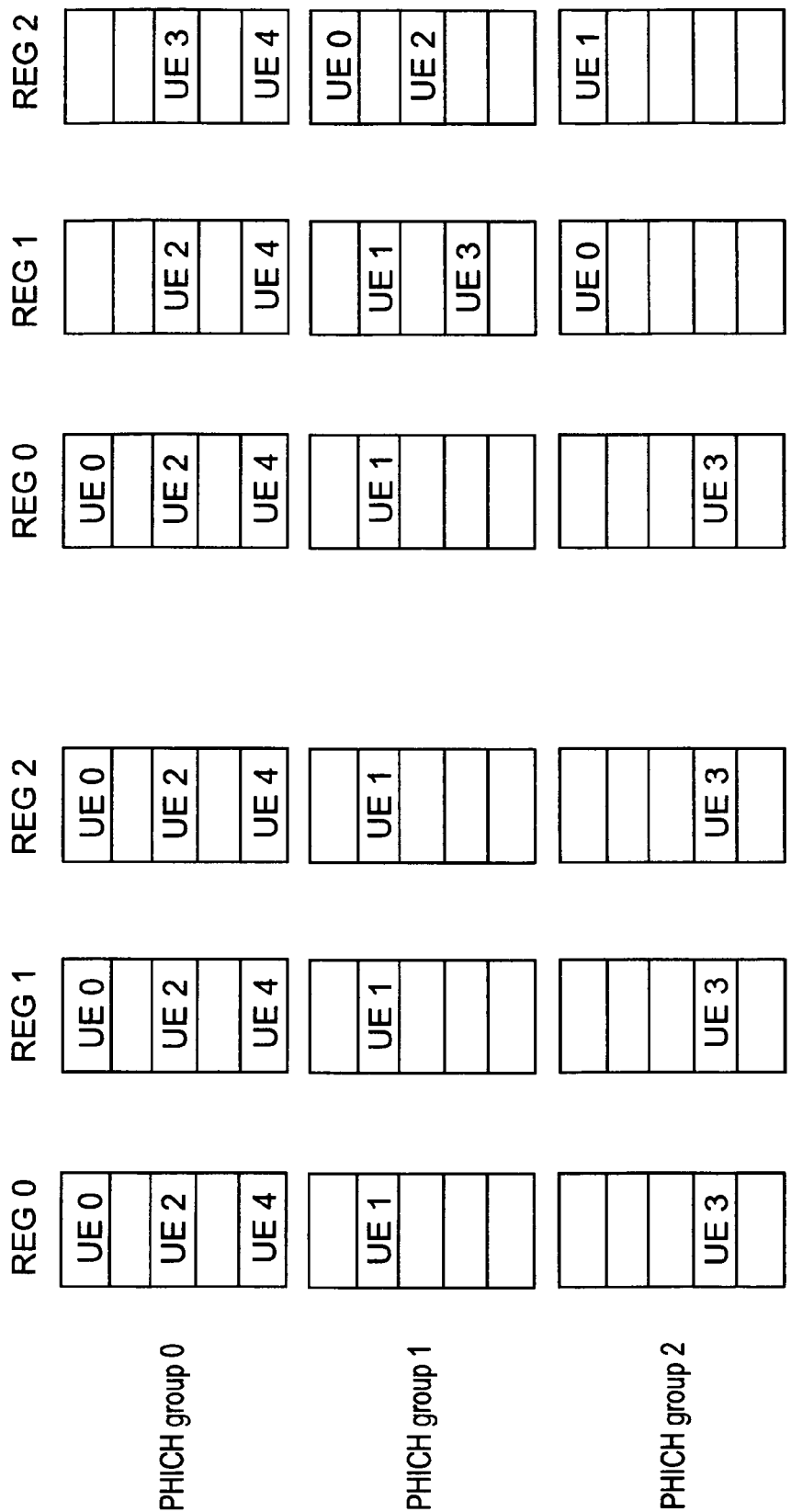
FIG. 7 schematically illustrates an assignment of PHICH signals to resource element groups as an embodiment according to the principles of the present invention.

UE 0 is also assigned with PHICH group 0 in the second repetition; and UE 0 is still assigned with PHICH group 0 in the third repetition. In the proposed assignment according to the embodiment of the principles of the present invention, UE 0 is assigned with PHICH groups 0, 2, 1 for the first repetition, second repetition, and third repetition, respectively. The assignment of PHICH signals can be alternatively described as in FIG. 7. In the figure, REG i of a PHICH group is represented by a rectangle. In each rectangle, a set of UE indices are shown there. For example, in REG 0 of PHICH group 0, three UE indices UE 0, UE 2 and UE 4 are there. Each rectangle is partitioned evenly into five (5) parts by placing four horizontal cuts. Then, the UE indices are shown in such a way that the topmost part in a rectangle is assigned PHICH sequence index $$(n_{PHICH}^{seq})0,$$

the second is assigned to PHICH sequence index 1, and so on. In the figure, the vertical position of a UE within a box representing an REG of a PHICH group is related to the PHICH sequence index. For example, the top position is tied to PHICH sequence 0, while the bottom is to PHICH sequence 4. As we can see in Table 1, the firth sequence $$(n_{PHICH}^{seq} = 0)$$

is [1 1 1 1], and the fifth sequence $$(n_{PHICH}^{seq} = 4)$$

is j[1 1 1 1], which is just a multiple of sequence j and [1 1 1 1]. In the original assignment, UEs 0 and 4 use [1 1 1 1] and j[1 1 1 1] respectively. That is, UE0 uses PHICH sequence 0, which is a Walsh code [1 1 1 1], and UE4 uses PHICH sequence 4, which is j[1 1 1 1]. Since these two sequences j[1 1 1 1] and [1 1 1 1] are based on the same Walsh code, [1 1 1 1], we say that these two sequences collide in I-Q domain (or in real-and-imaginary). Therefore, UEs 0 and 4 collide in all of the three repetitions in PHICH group 0. This collision may cause error performance degradation if we do real channel estimation. On the other hand, in the proposed assignment they collide only once in REG 0, from which one may expect a BER improvement for UE 0 (or UE 4) in the case of the severe I/Q leakage.

Note that the present invention of determining the PHICH index $K_{PHICH,i}$, and the PHICH resource index pair $$(n_{PHICH}^{group}(K_{PHICH,i}), n_{PHICH}^{seq}(K_{PHICH,i})),$$

can be implemented in a UE when receiving an acknowledgement signal from a BS. In this case, the PHICH index $K_{PHICH,i}$ is determined based on the first PRB index assigned to a UE. For an uplink transmission, eNodeB assigns a set of consecutive PRBs to a UE by sending a control message, which is so-called physical downlink control channel (PDCCH) format 0, as defined in Section 5.3.3.1.1 of 3GPP LTE standards TS 36.212. version 8.3.0. Once a UE receives PDCCH format 0, a few subframes later, the UE transmits a packet to the eNodeB over the set of PRBs it has been assigned to. Then, the eNodeB attempts to decode the message. After decoding the message, the eNodeB checks if the packet is received erroneously or not, and a few subframes later, the eNodeB informs the UE the decoding result by using the PHICH. The physical resource over which PHICH is transmitted is determined by the procedure in the current invention. This PHICH indices can be calculated at both the eNodeB and the UE, since both of them knows the PRBs allocated in the previous uplink transmission.

Figure 8A:
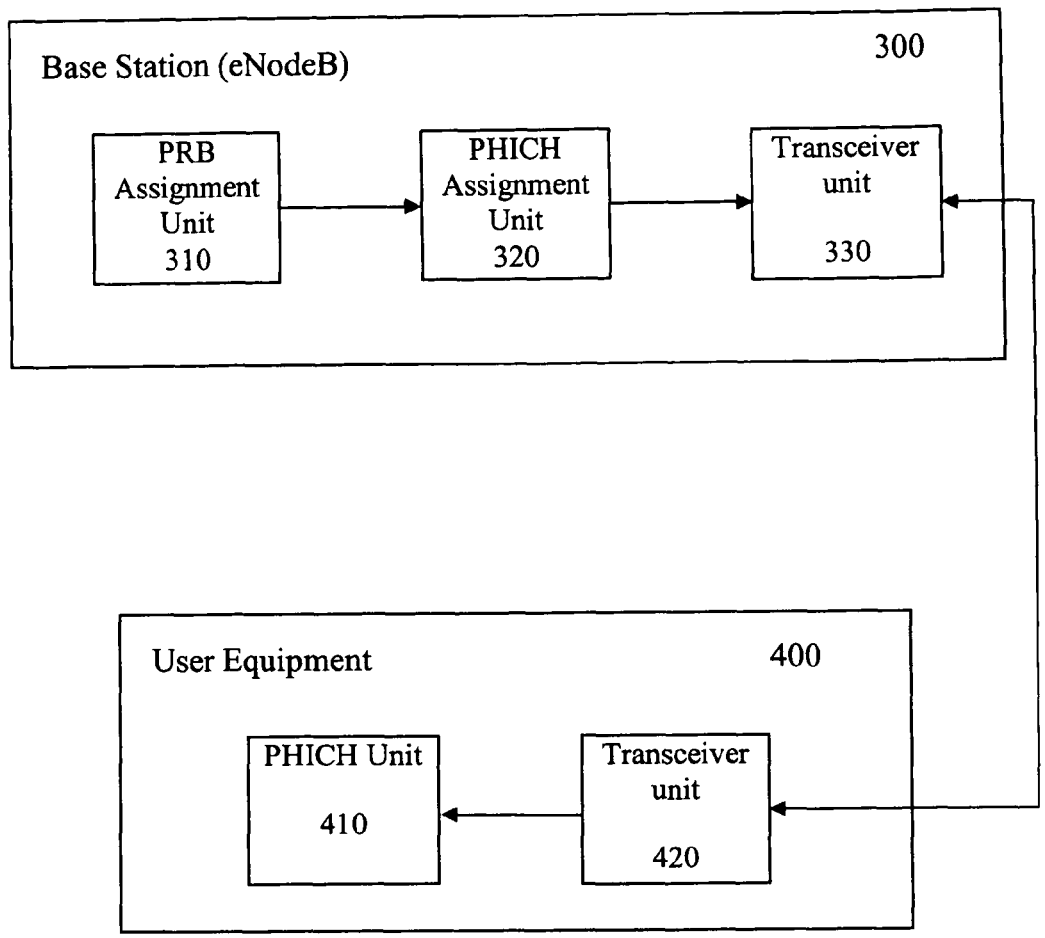
FIG. 8(a) schematically illustrates a base station (BS, i.e., eNodeB) for mapping downlink PHICHs, and a unit of user equipment for calculating downlink PHICHs as an embodiment according to the principles of the present invention.
Figure 8B:
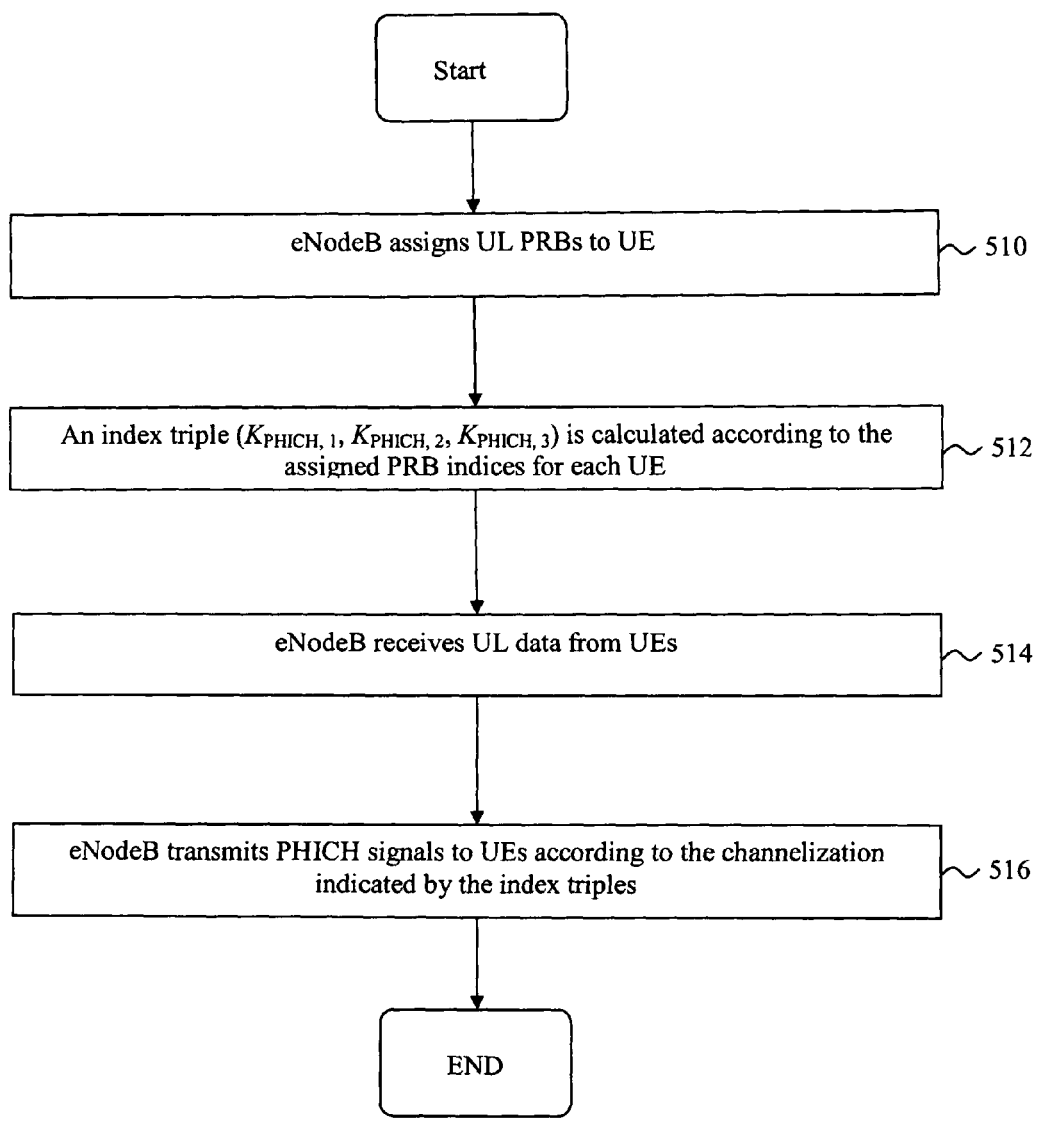
FIG. 8(b) is a flow chart outlining a communication procedure at a base station (eNodeB) as an embodiment according to the principles of the present invention.
Figure 8C:
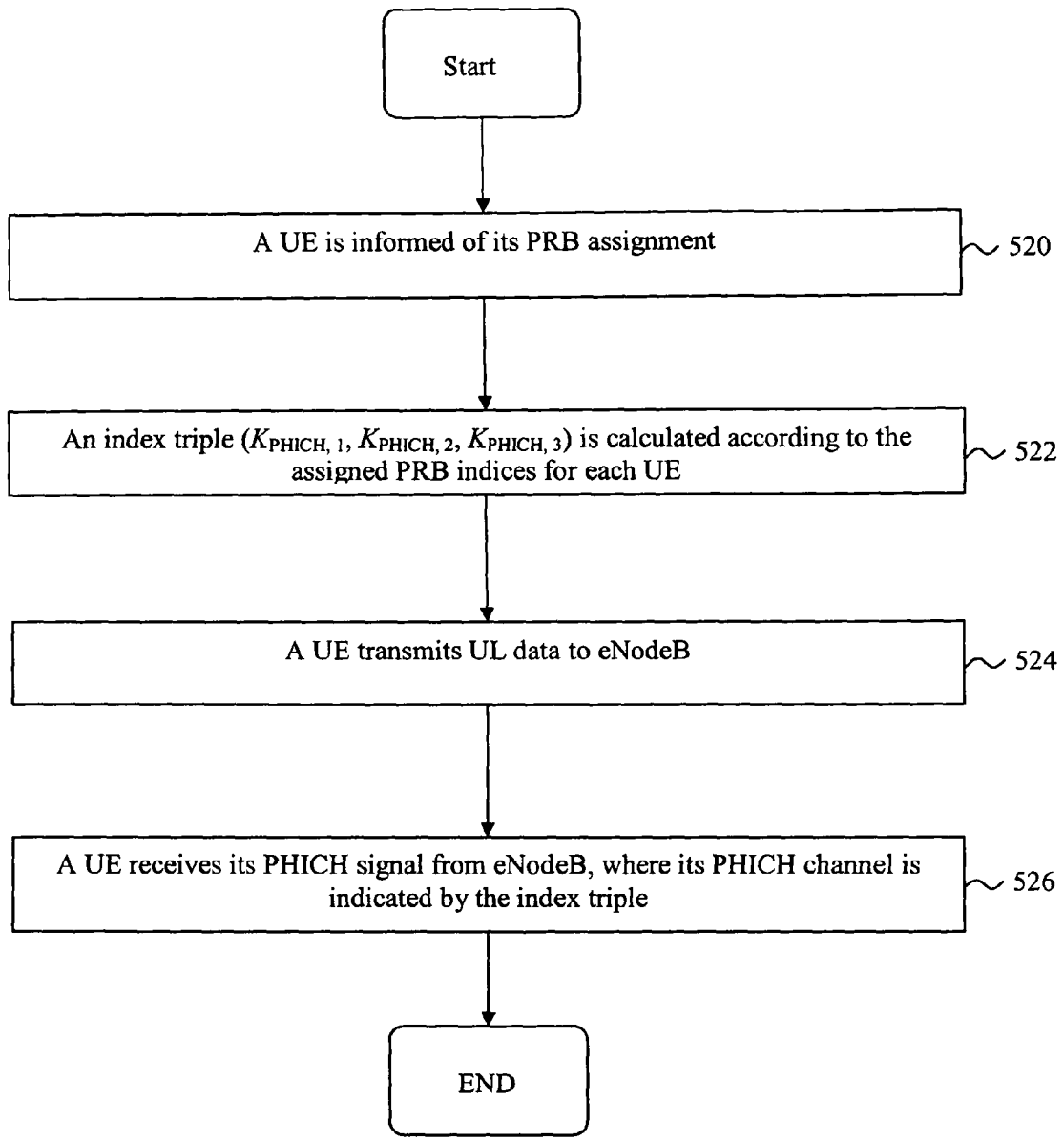
FIG. 8(c) is a flow chart outlining a communication procedure at a unit of user equipment as an embodiment according to the principles of the present invention.

FIG. 8(a) schematically illustrates a base station (BS, i.e., eNodeB) for mapping downlink PHICHs, and a unit of user equipment for calculating downlink PHICHs as an embodiment according to the principles of the present invention. FIG. 8(b) is a flow chart outlining a communication procedure at a base station (eNodeB) as an embodiment according to the principles of the present invention. FIG. 8(c) is a flow chart outlining a communication procedure at a unit of user equipment as an embodiment according to the principles of the present invention.

At the base station side, first, BS 300 assigns UL PRBs to a unit of user equipment by using a PRB assignment unit 310 and transmits a PDCCH format 0 signal containing the PRB assignment information to the UE by using a transceiver unit 330 (step 510). BS 300 calculates an index triple ($K_{PHICH,0}$, $K_{PHICH,1}$, $K_{PHICH,2}$) in accordance with the PRB assignment by using a PHICH assignment unit 320 (step 512). When BS 300 receives UL data from UEs (step 514), BS 300 transmits PHICH signals to UEs according to the index triple ($K_{PHICH,0}$, $K_{PHICH,1}$, $K_{PHICH,2}$) by using transceiver unit 330 (step 516).

At the user equipment side, first, UE 400 is informed of the PRB assignment information by receiving the PDCCH format 0 signal at a transceiver unit 420 (step 520). Then, UE 400 calculates an index triple ($K_{PHICH,0}$, $K_{PHICH,1}$, $K_{PHICH,2}$) in accordance with the PRB assignment by using a PHICH unit 420 (step 522). After UE 400 transmits uplink data to BS 300 at step 524, UE 400 receives its PHICH signal from BS 300, where the PHICH channel used for PHICH signal transmission is indicated by the index triple ($K_{PHICH,0}$, $K_{PHICH,1}$, $K_{PHICH,2}$) (step 526).

While the present invention has been shown and described in connection with the preferred embodiments, it will be apparent to those skilled in the art that modifications and variations can be made without departing from the spirit and scope of the invention as defined by the appended claims.

What is claimed is:

1. A method for transmission in a communication system, the method comprising:
   assigning, at a base station, uplink (UL) physical resource block (PRB) indices to a subset of units of user equipment (UE) in a Third Generation Partnership Project (3GPP) communication system extending between the base station and a plurality of units of user equipment;
   for each user equipment, calculating, at the base station, an index triple ($K_{PHICH,1}$, $K_{PHICH,2}$, $K_{PHICH,3}$) for three repetitions of a Physical Hybrid Automatic Repeat-reQuest (HARQ) Indicator Channel (PHICH) signal to be transmitted to the user equipment, with $K_{PHICH,i}$ being a PHICH index indicating a PHICH resource for transmitting the i-th repetition of the PHICH signal to the user equipment, and i=1, 2, 3;
   receiving data packets from a unit of user equipment transmitted via the PRBs indicated by the PRB indices assigned to the user equipment;
   forming multiple PHICH groups by mapping a plurality of PHICH resources to multiple sets of resource elements, with one PHICH group corresponding to one set of resource elements, each PHICH group comprising more than two PHICH resources, and each PHICH resource being indicated by a physical resource index pair $$(n_{PHICH}^{group}, n_{PHICH}^{sec}),$$

where $$n_{PHICH}^{group}$$

is the PHICH group index and $$n_{PHICH}^{sec}$$

is the PHICH resource index within the PHICH group;
   determining a physical resource index pair for each repetition of the PHICH signal based on the corresponding PHICH index; and
   transmitting each repetition of the PHICH signal to the user equipment by using the PHICH resource indicated by the physical resource index pair corresponding to the repetition.

2. The method of claim 1, wherein for each user equipment, the PHICH indices $K_{PHICH,1}$, $K_{PHICH,2}$, and $K_{PHICH,3}$, are the same.

3. The method of claim 1, wherein for each user equipment, the PHICH indices $K_{PHICH,1}$, $K_{PHICH,2}$, and $K_{PHICH,3}$, are different from each other.

4. The method of claim 1, wherein calculating the index triple comprises, for each user equipment, calculating the index triple in accordance with a scheme based upon the at least one PRB index that is assigned to the user equipment.

5. The method of claim 4, further comprising:
   when the user equipment is assigned one PRB index which is $$I_{PRB\_RA}^{lowest\_index},$$

assigning the index triple as:

$$(K_{PHICH,0}, K_{PHICH,1}, K_{PHICH,2}) = (I_{PRB\_RA}^{lowest\_index}, I_{PRB\_RA}^{lowest\_index}, I_{PRB\_RA}^{lowest\_index});$$

when the user equipment is assigned two PRB indices, and the lower PRB index is $$I_{PRB\_RA}^{lowest\_index},$$

assigning the index triple as:

$$(K_{PHICH,0}, K_{PHICH,1}, K_{PHICH,2}) = (I_{PRB\_RA}^{lowest\_index}, I_{PRB\_RA}^{lowest\_index}, I_{PRB\_RA}^{lowest\_index} + 1);$$

and
when the user equipment is assigned more than two PRB indices, and the lowest PRB index is $$I_{PRB\_RA}^{lowest\_index},$$

assigning the index triple as:

$$(K_{PHICH,0}, K_{PHICH,1}, K_{PHICH,2}) = (I_{PRB\_RA}^{lowest\_index}, I_{PRB\_RA}^{lowest\_index} + 2, I_{PRB\_RA}^{lowest\_index} + 1).$$

6. The method of claim 4, further comprising:

when the user equipment is assigned one PRB index which is $$I_{PRB\_RA}^{lowest\_index},$$

assigning the index triple as:

$$(K_{PHICH,0}, K_{PHICH,1}, K_{PHICH,2}) = (I_{PRB\_RA}^{lowest\_index}, I_{PRB\_RA}^{lowest\_index}, I_{PRB\_RA}^{lowest\_index});$$

when the user equipment is assigned two PRB indices, and the higher PRB index is $$I_{PRB\_RA}^{lowest\_index},$$

assigning the index triple as:

$$(K_{PHICH,0}, K_{PHICH,1}, K_{PHICH,2}) = (I_{PRB\_RA}^{lowest\_index}, I_{PRB\_RA}^{lowest\_index}, I_{PRB\_RA}^{lowest\_index} - 1);$$

and when the user equipment is assigned more than two PRB indices, and the highest PRB index is $$I_{PRB\_RA}^{lowest\_index},$$

assigning the index triple as:

$$(K_{PHICH,0}, K_{PHICH,1}, K_{PHICH,2}) = (I_{PRB\_RA}^{lowest\_index}, I_{PRB\_RA}^{lowest\_index} - 2, I_{PRB\_RA}^{lowest\_index} - 1).$$

7. The method of claim 4, further comprising:

when the user equipment is assigned one PRB index which is $$I_{PRB\_RA}^{lowest\_index},$$

assigning me index triple as:

$$(K_{PHICH,0}, K_{PHICH,1}, K_{PHICH,2}) = (I_{PRB\_RA}^{lowest\_index}, I_{PRB\_RA}^{lowest\_index}, I_{PRB\_RA}^{lowest\_index});$$

when the user equipment is assigned two PRB indices, and the lower PRB index is $$I_{PRB\_RA}^{lowest\_index},$$

assigning the index triple as:

$$(K_{PHICH,0}, K_{PHICH,1}, K_{PHICH,2}) = (I_{PRB\_RA}^{lowest\_index}, I_{PRB\_RA}^{lowest\_index}, I_{PRB\_RA}^{lowest\_index});$$

and when the user equipment is assigned more than two PRB indices, and the lowest PRB index is $$I_{PRB\_RA}^{lowest\_index},$$

assigning the index triple as:

$$(K_{PHICH,0}, K_{PHICH,1}, K_{PHICH,2}) = (I_{PRB\_RA}^{lowest\_index}, I_{PRB\_RA}^{lowest\_index} - 2, I_{PRB\_RA}^{lowest\_index} - 1).$$

8. The method of claim 4, wherein each unit of user equipment is configured to operate in one of a virtual-multiple-input multiple-output (MIMO) mode and a normal mode, the method further comprising assigning the index triples to the units of user equipment in the virtual-MIMO mode and the units of user equipment in the normal mode by using a same scheme.

9. The method of claim 8, further comprising transmitting a message to a unit of user equipment indicating whether the user equipment is configured to operate in the virtual-MIMO mode or in the normal mode.

10. The method of claim 4, wherein each unit of user equipment is configured to operate in one of a virtual-multiple-input multiple-output (MIMO) mode and a normal mode, the method further comprising assigning the index triples to the units of user equipment in the virtual-MIMO mode and the units of user equipment in the normal mode by using different schemes.

11. The method of claim 10, further comprising transmitting a message to a unit of user equipment indicating whether the user equipment is configured to operate in the virtual-MIMO mode or in the normal mode.

12. The method of claim 1, wherein determining the physical resource index pair comprises determining the physical resource index pair for each repetition of the PHICH signal based on a linking scheme between the corresponding PHICH index and the physical resource index pair.

13. The method of claim 1, wherein determining the physical resource index pair comprises determining the physical resource index pair as:

$$n_{PHICH}^{group}(K_{PHICH,i}) = (K_{PHICH,i} + n_{DMRS}) \bmod N_{PHICH}^{group}$$

$$n_{PHICH}^{sec}(K_{PHICH,i}) = (\lfloor K_{PHICH,i} / N_{PHICH}^{group} \rfloor + n_{DMRS}) \bmod 2N_{SF}^{PHICH},$$

where $n_{DMRS}$ denotes the cyclic shift of the Demodulation Reference Symbol (DMRS) used by the user equipment and $$N_{SF}^{PHICH}$$

denotes a spreading factor size used for PHICH modulation.

14. The method of claim 1, wherein determining the physical resource index pair comprises determining the physical resource index pair as:

$$n_{PHICH}^{group}(K_{PHICH,i}) = (K_{PHICH,i} + n_{DMRS}) \bmod N_{PHICH}^{group}$$

$$n_{PHICH}^{sec}(K_{PHICH,i}) = \lfloor (K_{PHICH,i} / n_{DMRS}) / N_{PHICH}^{group} \rfloor \bmod 2N_{SF}^{PHICH},$$

where $n_{DMRS}$ denotes the cyclic shift of the Demodulation Reference Symbol (DMRS) used by the user equipment and $$N_{SF}^{PHICH}$$

denotes a spreading factor size used for PHICH modulation.

15. The method of claim 1, wherein each PHICH group corresponds to a plurality of resource element groups, the method further comprising mapping the PHICH group index for the i-th repetition of the PHICH signal, $$n_{PHICH}^{group}(K_{PHICH,i}),$$

to the i-th resource element group of the PHICH group indexed by $$n_{PHICH}^{group}(K_{PHICH,i}).$$

16. A wireless terminal, comprising:
a physical resource block (PRB) assignment unit configured to assign uplink (UL) physical resource block (PRB) indices to a subset of units of user equipment (UE) in a Third Generation Partnership Project (3GPP) communication system extending between the wireless terminal and a plurality of units of user equipment;
a PHICH assignment unit configured to calculate, for each user equipment, an index triple ($K_{PHICH, 1}$, $K_{PHICH, 2}$, $K_{PHICH, 3}$) for three repetitions of a Physical Hybrid Automatic Repeat-reQuest (HARQ) Indicator Channel (PHICH) signal to be transmitted to the user equipment, with $K_{PHICH, i}$ being a PHICH index indicating a PHICH resource for transmitting the i-th repetition of the PHICH signal to the user equipment, and i=1, 2, 3; and
a transceiver unit configured (i) to receive data packets from a unit of user equipment transmitted via the PRBs indicated by the PRB indices assigned to the user equipment, (ii) to form multiple PHICH groups by mapping a plurality of PHICH resources to multiple sets of resource elements, with one PHICH group corresponding to one set of resource elements, each PHICH group comprising more than two PHICH resources, and each PHICH resource being indicated by a physical resource index pair $$(n_{PHICH}^{group}, n_{PHICH}^{sec}),$$

where $$n_{PHICH}^{group}$$

is the PHICH group index and $$n_{PHICH}^{sec}$$

is the PHICH resource index within the PHICH group, (iii) to determine a physical resource index pair for each repetition of the PHICH signal based on the corresponding PHICH index, and (iv) to transmit each repetition of the PHICH signal to the user equipment by using the PHICH resource indicated by the physical resource index pair corresponding to the repetition.

17. The wireless terminal of claim 16, wherein for each user equipment, the PHICH indices $K_{PHICH, 1}$, $K_{PHICH, 2}$, and $K_{PHICH, 3}$ are the same.

18. The wireless terminal of claim 16, wherein for each user equipment, the PHICH indices $K_{PHICH, 1}$, $K_{PHICH, 2}$, and $K_{PHICH, 3}$, are different from each other.

19. The wireless terminal of claim 16, wherein the PHICH assignment unit is configured to calculate, for each user equipment, the index triple in accordance with a scheme based upon the at least one PRB index that is assigned to the user equipment.

20. The wireless terminal of claim 19, wherein:
when the user equipment is assigned one PRB index which is $$I_{PRB\_RA}^{lowest\_index},$$

the PHICH assignment unit is configured to assign the index triple as:

$$(K_{PHICH,0}, K_{PHICH,1}, K_{PHICH,2}) = (I_{PRB\_RA}^{lowest\_index}, I_{PRB\_RA}^{lowest\_index}, I_{PRB\_RA}^{lowest\_index});$$

when the user equipment is assigned two PRB indices, and the lower PRB index is $$I_{PRB\_RA}^{lowest\_index},$$

the PHICH assignment unit is configured to assign the index triple as:

$$(K_{PHICH,0}, K_{PHICH,1}, K_{PHICH,2}) = (I_{PRB\_RA}^{lowest\_index}, I_{PRB\_RA}^{lowest\_index}, I_{PRB\_RA}^{lowest\_index} + 1);$$

and when the user equipment is assigned more than two PRB indices, and the lowest PRB index is $$I_{PRB\_RA}^{lowest\_index},$$

the PHICH assignment unit is configured to assign the index triple as:

$$(K_{PHICH,0}, K_{PHICH,1}, K_{PHICH,2}) =$$
$$(I_{PRB\_RA}^{lowest\_index}, I_{PRB\_RA}^{lowest\_index} + 2, I_{PRB\_RA}^{lowest\_index} + 1).$$

21. The wireless terminal of claim 19, wherein:
when the user equipment is assigned one PRB index which is $$I_{PRB\_RA}^{lowest\_index},$$

the PHICH assignment unit is configured to assign the index triple as:

$$(K_{PHICH,0}, K_{PHICH,1}, K_{PHICH,2}) = (I_{PRB\_RA}^{lowest\_index}, I_{PRB\_RA}^{lowest\_index}, I_{PRB\_RA}^{lowest\_index});$$

when the user equipment is assigned two PRB indices, and the higher PRB index is $$I_{PRB\_RA}^{lowest\_index},$$

the PHICH assignment unit is configured to assign the index triple as:

$$(K_{PHICH,0}, K_{PHICH,1}, K_{PHICH,2}) = (I_{PRB\_RA}^{lowest\_index}, I_{PRB\_RA}^{lowest\_index}, I_{PRB\_RA}^{lowest\_index} - 1);$$

and when the user equipment is assigned more than two PRB indices, and the highest PRB index is $$I_{PRB\_RA}^{lowest\_index},$$

the PHICH assignment unit is configured to assign the index triple as:

$$(K_{PHICH,0}, K_{PHICH,1}, K_{PHICH,2}) =$$
$$(I_{PRB\_RA}^{lowest\_index}, I_{PRB\_RA}^{lowest\_index} - 2, I_{PRB\_RA}^{lowest\_index} - 1).$$

22. The wireless terminal of claim 19, wherein:
when the user equipment is assigned one PRB index which is $$I_{PRB\_RA}^{lowest\_index},$$

the PHICH assignment unit is configured to assign the index triple as:

$$(K_{PHICH,0}, K_{PHICH,1}, K_{PHICH,2}) = (I_{PRB\_RA}^{lowest\_index}, I_{PRB\_RA}^{lowest\_index}, I_{PRB\_RA}^{lowest\_index});$$

when the user equipment is assigned two PRB indices, and the lower PRB index is $$I_{PRB\_RA}^{lowest\_index},$$

the PHICH assignment unit is configured to assign the index triple as:

$$(K_{PHICH,0}, K_{PHICH,1}, K_{PHICH,2}) = (I_{PRB\_RA}^{lowest\_index}, I_{PRB\_RA}^{lowest\_index}, I_{PRB\_RA}^{lowest\_index});$$

and when the user equipment is assigned more than two PRB indices, and the lowest PRB index is $$I_{PRB\_RA}^{lowest\_index},$$

the PHICH assignment unit is configured to assign the index triple as:

$$(K_{PHICH,0}, K_{PHICH,1}, K_{PHICH,2}) =$$
$$(I_{PRB\_RA}^{lowest\_index}, I_{PRB\_RA}^{lowest\_index} - 2, I_{PRB\_RA}^{lowest\_index} - 1).$$

23. The wireless terminal of claim 19, wherein the PHICH assignment unit is configured to assign the index triples to the units of user equipment in a virtual-MIMO mode and the units of user equipment in a normal mode by using a same scheme.

24. The wireless terminal of claim 23, wherein the transceiver unit is configured to transmit a message to a unit of user equipment indicating whether the user equipment is operating in the virtual-MIMO mode or in the normal mode.

25. The wireless terminal of claim 19, wherein the PHICH assignment unit is configured to assign the index triples to the units of user equipment in a virtual-MIMO mode and the units of user equipment in a normal mode by using different schemes.

26. The wireless terminal of claim 25, wherein the transceiver unit is configured to transmit a message to a unit of user equipment indicating whether the user equipment is operating in the virtual-MIMO mode or in the normal mode.

27. The wireless terminal of claim 16, wherein the transceiver unit is configured to determine the physical resource index pair by determining the physical resource index pair for each repetition of the PHICH signal based on a linking scheme between the corresponding PHICH index and the physical resource index pair.

28. The wireless terminal of claim 16, wherein the transceiver unit is configured to determine the physical resource index pair as:

$$n_{PHICH}^{group}(K_{PHICH,i}) = (K_{PHICH,i} + n_{DMRS}) \bmod N_{PHICH}^{group}$$
$$n_{PHICH}^{sec}(K_{PHICH,i}) = (\lfloor K_{PHICH,i} / N_{PHICH}^{group} \rfloor + n_{DMRS}) \bmod 2N_{SF}^{PHICH},$$

where $n_{DMRS}$ denotes the cyclic shift of the Demodulation Reference Symbol (DMRS) used by the user equipment and $$N_{SF}^{PHICH}$$

denotes a spreading factor size used for PHICH modulation.

29. The wireless terminal of claim 16, wherein the transceiver unit is configured to determine the physical resource index pair as:

$$n_{PHICH}^{group}(K_{PHICH,i}) = (K_{PHICH,i} + n_{DMRS}) \bmod N_{PHICH}^{group}$$
$$n_{PHICH}^{sec}(K_{PHICH,i}) = \lfloor (K_{PHICH,i} + n_{DMRS}) / N_{PHICH}^{group} \rfloor \bmod 2N_{SF}^{PHICH},$$

where $n_{DMRS}$ denotes the cyclic shift of the Demodulation Reference Symbol (DMRS) used by the user equipment and $$N_{SF}^{PHICH}$$

denotes a spreading factor size used for PHICH modulation.

30. The wireless terminal of claim 16, wherein each PHICH group corresponds to a plurality of resource element groups, the wireless terminal further comprising a resource element group mapping unit configured to map the PHICH group index for the i-th repetition of the PHICH signal, $$n_{PHICH}^{group}(K_{PHICH,i}),$$

to the i-th resource element group of the PHICH group indexed by $$n_{PHICH}^{group}(K_{PHICH,i}).$$

31. A method for communication, comprising:
receiving a control signal at a unit of user equipment from a base station, with the control signal comprising uplink (UL) physical resource block (PRB) indices assigned to the user equipment in a Third Generation Partnership Project (3GPP) communication system extending between the base station and a plurality of units of user equipment;
calculating, at the user equipment, an index triple $(K_{PHICH,1}, K_{PHICH,2}, K_{PHICH,3})$ for three repetitions of a Physical Hybrid Automatic Repeat-reQuest (HARQ) Indicator Channel (PHICH) signal to be received by the user equipment, with $K_{PHICH,i}$ being a PHICH index indicating a PHICH resource for transmitting the i-th repetition of the PHICH signal to the user equipment, and i = 1, 2, 3;
transmitting a data packet from the user equipment to the base station via the PRBs indicated by the PRB indices assigned to the user equipment, wherein multiple PHICH groups are formed by mapping a plurality of PHICH resources to multiple sets of resource elements, with one PHICH group corresponding to one set of resource elements, each PHICH group comprising more than two PHICH resources, and each PHICH resource being indicated by a physical resource index pair $$(n_{PHICH}^{group}, n_{PHICH}^{sec}),$$

where $$n_{PHICH}^{group}$$

is the PHICH group index and $$n_{PHICH}^{sec}$$

is the PHICH resource index within the PHICH group, and wherein a physical resource index pair is determined for each repetition of the PHICH signal based on the corresponding PHICH index;
receiving at the user equipment each repetition of the PHICH signal from the base station; and
decoding each repetition of the PHICH signal at the user equipment by using the PHICH resource indicated by the physical resource index pair corresponding to the repetition.

32. A wireless terminal, comprising:
a transceiver unit configured to receive a control signal at a unit of user equipment from a base station, with the control signal comprising uplink (UL) physical resource block (PRB) indices assigned to the user equipment in a Third Generation Partnership Project (3GPP) communication system extending between the base station and a plurality of units of user equipment; and
a Physical Hybrid Automatic Repeat-reQuest (HARQ) Indicator Channel (PHICH) unit configured to calculate an index triple $(K_{PHICH,1}, K_{PHICH,2}, K_{PHICH,3})$ for three repetitions of a PHICH signal to be received by the user equipment, with $K_{PHICH,i}$ being a PHICH index indicating a PHICH resource for transmitting the i-th repetition of the PHICH signal to the user equipment, and i=1, 2, 3;

wherein multiple PHICH groups are formed by mapping a plurality of PHICH resources to multiple sets of resource elements, with one PHICH group corresponding to one set of resource elements, each PHICH group comprising more than two PHICH resources, and each PHICH resource being indicated by a physical resource index pair $$(n_{PHICH}^{group}, n_{PHICH}^{sec}),$$

where $$n_{PHICH}^{group}$$

is the PHICH group index and $$n_{PHICH}^{sec}$$

is the PHICH resource index within the PHICH group, and wherein a physical resource index pair is determined for each repetition of the PHICH signal based on the corresponding PHICH index; and wherein the transceiver unit is further configured to receive at the user equipment each repetition of the PHICH signal from the base station and to decode each repetition of the PHICH signal at the user equipment by using the PHICH resource indicated by the physical resource index pair corresponding to the repetition.

* * * * *